3,357,014
STANDARD TARGET RADAR
David Atlas, Newton, Mass.
Filed Nov. 29, 1965, Ser. No. 510,472
9 Claims. (Cl. 343—10)

The invention described herein may be manufactured and used by or for the United States Government for governmental purposes without payment to me of any royalty thereon.

This invention relates to radar or radio detection and location systems and specifically to the radio location of objects equipped with a standard target the cross-section of which may be modulated. It also relates to antenna pattern and antenna gain measuring devices. It also pertains to a system of transmitting intelligence from the modulated radar target to the radar.

In conventional radar systems, range to a target is determined either by the elapsed time between transmission of a pulse and reception of the echo, or by the frequency shift between transmitted and received energy in a frequency modulated radar system. However in accordance with the present invention a method and system is provided of determining range to an object by measurement of the echo intensity received from that object when it is equipped with a modulated standard target.

The echo power, $P_r$, returned by a radar target of cross-section $\sigma$ is given by the equation:

$$P_r = \frac{LP_t G_t}{(4\pi)^2 r^4} A_r \sigma \tag{1}$$

where:

$P_r$ = echo power
$P_t$ = peak transmitted power
$G_t$ = gain of the transmitting antenna in the direction of the target
$A_r$ = effective area of the receiving antenna in the direction of the target
$\sigma$ = back-scatter cross-section of the target
$r$ = range to the target The factor L is a variable (less than 1) which accounts for such losses as that due to atmospheric attenuation, losses through a radome when wet, and anamalous propagation.

The effective area of the antenna is related to the gain by the relation $$G = 4\pi A_e/\lambda^2 \tag{2}$$

where $\lambda$ is the wavelength. Substituting this into Equation 1 gives the relation $$P_r = \frac{LP_t G^2 \lambda^2 \sigma}{(4\pi)^3 r^4} \tag{3}$$

It is then apparent that if the radar characteristics and the target cross-section are accurately known, then the echo power $P_r$ is a unique function of range, provided of course that there are no losses (i.e. $L=1$). We will consider the effect of such losses later. In other words, the echo power provides a measurement of range. Of course, it is not ordinarily possible to measure range in this way since the cross-sections of radar targets are unknown. In fact, that of an aircraft is highly variable, depending on the aircraft's aspect with respect to the radar.

In my invention which is hereinafter referred to as the STADAR system, the latter difficulty is overcome by equipping each and every object to be detected with a standard target of known cross-section and modulating the cross-section in a prescribed manner. For example, the cross-section may be amplitude modulated at a well-defined frequency. The receiving system is then designed to pass signals having this and only this prescribed frequency of amplitude modulation. In this way, the echo power which is due to the background cross-section of the object carrying the modulated standard target is nullified, leaving only the echo associated with the standard target. Obviously only those objects equipped with the modulated standard targets will be detected. Therefore STADAR is a system for the detection of friendly objects. A very substantial advantage of STADAR is its ability to distinguish cooperating targets from large background echoes, either ground clutter or weather echoes.

A simple and economical standard target for use in this system is the spherical Luneberg lens. This target is a dielectric sphere of variable refractive index equipped with a spherical metal cap. Normally, the Luneberg lens reflector is intended to be viewed with the cap on its far side. In this case, its maximum cross-section is given by $$\sigma = 4\pi A^2/\lambda^2 \tag{4}$$

where A is the geometrical cross-section of the sphere. However, if the lens is viewed with the metal cap on the front, its cross-section is essentially that of a metal sphere of area A and cross-section $\sigma = A$. Half-way between these two positions, the cross-section drops substantially to zero. Therefore, if the Luneberg lens is spun around its axis at rotation rate $f$, its cross-section will be modulated from $\sigma = 0$ to that given by Equation 4 with frequency $f$.

There are a wide variety of passive standard targets which may be modulated in this manner. The simplest such target is a dielectric sphere of constant refractive index (refractive index less than 2) with a metal cap. In general such a dielectric target has a cross-section less than that of an equal-sized Luneberg lens, except when its diameter is of the order of a few wavelengths. While the Luneberg lens is generally the most efficient target, it is more economical to construct a lens of constant refractive index.

A passive parabolic reflector (with a perfect reflector at its focus) will also provide a maximum cross-section equal to that of the Luneberg lens of the same geometric area. It may also be rotated to provide the required amplitude modulation. However, in the case of the paraboloid full gain is realized only over an angle rotation equal to its beamwidth. With the spherical dielectric lens, full gain is achieved throughout an angle of rotation corresponding to slightly less than the angular size of the metal cap.

If we assume the use of a 12 inch diameter Luneberg lens target with a 90 degree cap at a wavelength of 5.6 cm., its maximum cross-section will be 21 m.$^2$. When rotated, the cross-section will vary from the background value of the carrying vehicle to $\sigma_b + 21$ m.$^2$ at a frequency corresponding to the rate of rotation $f$. The background cross-section of the carrying vehicle will contribute either a steady signal or a randomly varying one while that from the spinning lens will be modulated exactly at frequency $f$. By choosing $f$ higher than any of the random fluctuation frequencies of the carrier vehicle, the receiver can be designed to pass only that portion of the signal which is modulated at frequency $f$. As aforementioned the Luneberg lens operates at a wavelength of 5.6 cm. At this wavelength or wavelengths above 5 cm. losses in signal strength lue to a wet randome and storm attenuation are extremely small, and at 10 cm. they are negligible. Thus to obtain accurate ranging under storm conditions, the preferred wavelengths of operation would be 5 cm. or larger. The deleterious effects of anomalous propogation would be more difficult to consider; however, these are relatively uncommon. Moreover, they effect the position location of any electromagnetic system, and their effects would be no greater than this one.

Typical values of the radar cross-sections of aircraft vary from 1 to about 10 m.² Thus, the cross-section of most aircraft will be greatly enhanced by the Luneberg lens. Furthermore, rotation of the lens will assure that the target cross-section which is measured will be independent of the aircraft aspect.

Since echo power now provides a measure of the target range, it is unnecessary to use pulsed or frequency modulated transmission. Instead, we may utilize continuous wave (CW) transmission at a fixed frequency. This greatly simplifies the design of the radar system. However, the present system may be employed with a wide variety of transmission modes, either pulse, FM, or constant frequency CW. The exact configuration is of little consequence.

It is an object of the present invention to provide a system and method of determining range to an object by measurement of the echo intensity received from that object when it is equipped with a modulated standard target.

It is also an object of the invention to provide a means of more accurately determining target direction than can be accomplished in conventional radar systems.

It is a further object to provide a simple means of discriminating between the echoes from such target-carrying objects and other unwanted background echoes such as those from the ground or precipitation.

Another object of this invention is to provide a simplified means for the measurement of antenna patterns and antenna gain.

Still another object of this invention is to provide a means of conveying intelligence from the target to the radar.

The various objects and features of novelty which characterize the present invention will appear more fully from the detailed description when read in conjunction with the attached drawings, in which.

Figure 1:
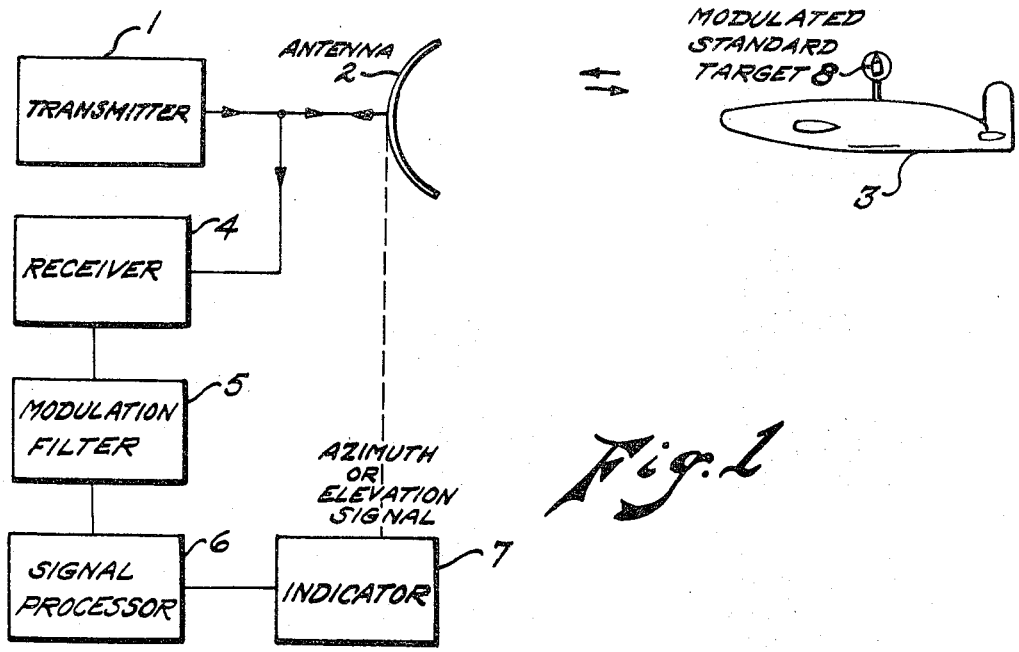
FIGURE 1 is a block diagram of a preferred embodiment of my invention.

The following description is provided in the most general terms in order to illustrate the broad scope of utility of the STADAR system.

Block 1 represents the transmitter, either pulse, FM, CW, interrupted CW, or any other type. Block 2 is the antenna system, either a single antenna for transmission and reception as in a conventional pulsed radar, or dual antennas, one for transmission and the other for reception. In short, the antenna system may be any type capable of providing information on the direction to the target.

Energy is radiated from the antenna system 2 to the object 3. Object 3 represents the object to be detected, either a vehicle of some sort such as an aircraft which is equipped with modulated standard target 8, or in some cases, the modulated standard target alone in the presence of background clutter. Modulated standard target 8 may be a Luneberg lens with a spherical metal cap wherein the lens is spun around its axis at rotation rate $f$ as hereinbefore described. The echo from the target 3 is comprised of a steady or randomly varying background component plus the amplitude modulated component due to the modulated standard target. This combined echo is returned through antenna system 2 to receiver 4.

Receiver 4 may be any of a wide variety of types designed to meet the requirement of the particular system and the nature of the transmitted signal. The receiver bandwidth must also be designed to accept frequency shifted signals in accordance with the Doppler velocity of the target. In most applications of the STADAR system, it will be desirable that the receiver have the broadest possible dynamic range. A logarithmic receiver is therefore desirable.

The detected output of receiver 4 is passed to modulation filter 5. In systems in which the standard target is modulated at a fixed frequency, modulation filter 5 may be a fixed frequency narrow band pass filter designed to pass only the modulation frequency. In those systems in which the standard target is modulated at a variable frequency, modulation 5 may be comprised of either a bank of narrow band pass filters, or a single band pass filter whose center frequency is made to scan the entire frequency range of the modulated standard target. In the case of moving targets having a wide range of Doppler velocities, or of a radar on a moving vehicle, optimum signal to background ratios would be obtained by Doppler filtering in the receiver prior to modulation filter 5.

In any case, the amplitude of the signal output of modulation filter 5 will be proportional only to that component of the total echo intensity which is returned from the standard target. If the background echo of the carrying vehicle or clutter has a fluctuation frequency component equal to that of the standard target, the signal output of filter 5 will be increased proportionately, thereby introducing an error in the echo intensity (and range) measurement. However, this error may be reduced to a negligible level by proper selection of the modulation frequency of the standard target.

The output of filter 5 is passed to a signal processor 6. The purpose of signal processor 6 is twofold. First, it is used to amplify the signal in proportion to the inverse fourth power of the echo intensity from the standard target. According to Equation 1, it is seen that the signal output of processor 6 will then be directly proportional to the range of the standard target. The output of the signal processor is passed to an indicator 7.

Indicator 7 is basically an angle-intensity (A-I) display in which one coordinate is determined by the angular position of the antenna (azimuth if the antenna is scanning in that mode, or elevation angle if scanning in a vertical plane), and the other coordinate is determined by the echo intensity of the standard target. One of many possible configurations of indicator 7 is illustrated schematically in FIGURE 2. As the antenna scans in azimuth across the direction of the target, the target will reflect signals proportional to the intensity of illumination. Thus, the echo from the target will draw out the radiation pattern of the illuminating antenna. The azimuth at which the maximum signal occurs represents the direction to the target, while the amplitude of the maximum clearly represents target range. It is apparent that the azimuth can be determined more accurately than with a conventional radar since the position of the peak signal can be measured to a fraction of a beam width. Of course, the radar may also utilize two or more lobes in its radiation pattern either to locate the target more precisely or to track it automatically.

In those cases in which the number of targets within STADAR range is large, it may be objectionable to present the entire antenna pattern corresponding to each and every target. In this case, processor 6 (FIG. 1) may incorporate a sensing circuit to sense and read out only the maximum signal corresponding to each target. In this case, the display (FIG. 2) would appear as a conventional B-scope or PPI scope.

The exact nature of signal processor 6 will depend on the response law of receiver 4 and may take a variety of forms. If the receiver is linear, then its output signal is proportional to the square root of input echo power, or $P^{1/2}$. Signal processor 6 might then comprise a logarithmic amplifier to obtain Log $P^{1/2}=\frac{1}{2}$ Log $P$, an inverter to obtain $-\frac{1}{2}$ Log $P$, and a factor of 2 attenuator to obtain $-\frac{1}{4}$ Log $P$=Log $P^{-1/4}$. This signal could then be displayed directly which would provide range on a logarithmic scale, or the processor 6 could include an anti-log circuit with output proportional to $P^{-1/4}$ in which case range would appear on a linear scale on indicator 7. Of course, if receiver 4 is logarithmic, then the operations in signal processor 6 are greatly simplified since we already have Log $P$.

Since the accuracy of range determination is a function of echo intensity, it is desirable that the antenna radiation pattern be broad and uniform in the direction perpendicular to the plane of scan (i.e. a broad vertical fan beam for azimuth scanning or a broad horizontal fan for vertical scanning). Considering all the possible contributions to errors in determining the absolute signal intensity, it is expected that the maximum overall error will be ±3 db. Since range varies as the ¼th power of signal intensity the extreme range errors would be +18.6 percent or −16 percent. More commonly, the errors in signal level measurement will be less than ±1 db. with corresponding range errors of ±5.7 percent. While such range accuracy is poorer than that attainable with a conventional pulse radar system, the great simplicity of the STADAR system recommends it for use where reduced range accuracy is tolerable. Furthermore, the reduced range accuracy is compensated in large part by the increased azimuth accuracy.

Because of the improved directional accuracy of the STADAR system and its simplicity of construction, improved range accuracy can be obtained by using two separated STADAR systems each sensing only the direction of the target. Intersection of the two direction plots on a display then determines the exact position of the aircraft. In an aircraft location system, the modulation frequency of the standard target may be coded according to the aircraft altitude so that STADAR may be used to sort out aircraft according to their height. This is a particular weakness of present conventional radar systems; altitude information is obtainable only from voice communication, a coded beacon, or from a separate height-finding radar. Of course the target modulation frequency may be used to signify any other information as desired.

Figure 2:
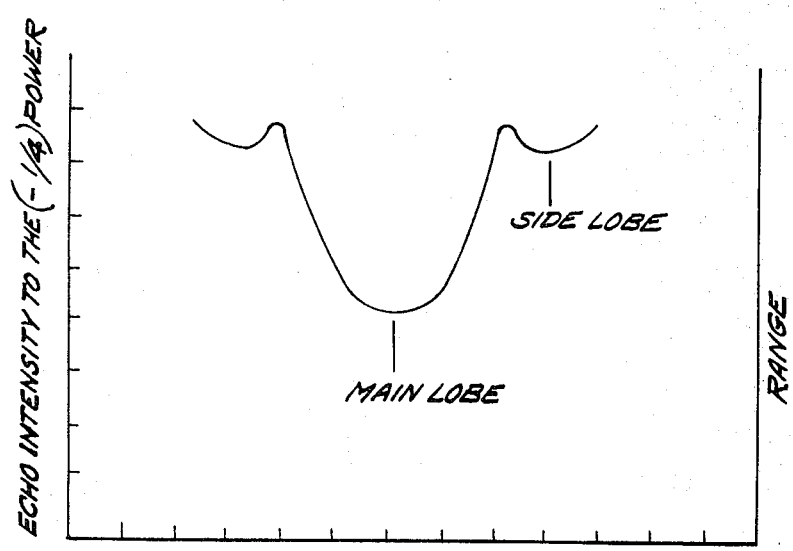
FIGURE 2 illustrates the face and waveform thereupon of the angle-intensity indicator which may be utilized for the indicator of the system shown in FIGURE 1.

It was noted earlier that the pattern seen on the indicator 7 of FIG. 1 as shown in FIG. 2 is exactly the radiation pattern of the antenna for two way transmission. Thus, if the standard target is placed at a known range, and the signal processor 6 simply presents echo intensity instead of the inverse fourth power of echo intensity, then according to Equation 3, the pattern represents the pattern of $G^2$ (gain square) of the antenna. If the processor 6 displays echo intensity to the ½ power then the pattern is identical to the one way gain pattern of the antenna. Thus, the STADAR system provides a simple means of calibrating antenna patterns quantitatively. In addition to simplicity, it permits the calibration of antennas in almost any location and in virtually all kinds of weather since the target modulation permits the automatic nullification of all background clutter.

Because the target is modulated at one or more of a set of well defined frequencies, each of which can be resolved by a modulation filter or one of a set of such filters in parallel, the receiver bandwidth can be reduced by many orders of magnitude below that of a conventional radar, and the system can operate with greatly reduced transmitter power and relatively low gain antennas. Furthermore since the direction of the target can be determined to a small fraction of a beamwidth, use may be made of relatively small antennas. Finally, since the standard targets rotate through 360 degrees and since their radar cross-sections can be made perfectly uniform over a wide vertical sector (virtually 180 degrees with a 180 deg. sector metal cap), the ground system has a reliable target regardless of the aspect of the vehicle.

Obviously, STADAR may also be used with pulsed transmission. In this case, the pulse repetition frequency should preferably be equal to or greater than twice the target modulation frequency in order that the modulation frequency be unambiguously determined.

Also, it is clear that the modulation of the target may be accomplished by a variety of means other than that of mechanical rotation.

What I claim is:

1. A radiant energy system for determining the direction and range of an object comprising positioning on said object a standard target having a predetermined cross-section being modulated, means including a transmitter and associated scanning antennas for directing radiant energy towards said object, means to receive return echoes from said object, said return echoes including a modulation content solely representative of said standard target, means to filter the return echoes to pass only the modulated signals, means to measure the intensity of said modulated signals to provide the range of said object, and means to measure the azimuth of maximum intensity of said modulated signals to provide the direction of said object.

2. A radiant energy system for determining the direction and range of an object as defined in claim 1 further including signal processor means receiving said output from said filter means, said signal processor being an amplifier to amplify the received signals thereto according to the inverse fourth power of their intensity for antenna calibration, and means displaying said signal processor output signal as a function of antenna rotation.

3. A radiant energy system for detecting the direction and range of an object as defined in claim 2 wherein said signal processor senses the maximum intensity from the return from said standard target during said antenna scan and said display means displays the position and intensity corresponding to said range of said object.

4. A radiant energy system for determining the location of an object comprising means for directing radiant energy toward said object to provide a return echo therefrom, a standard modulated target having a precisely preselected cross-section, said standard target being positioned on said object so that return echoes from said standard target can be separated from the overall echo background of said object, means for discriminating said return echoes from said target from those of said background, and means of measuring the range of said object exclusively from said discriminated target.

5. A radiant energy system as defined in claim 4 wherein the standard modulated target is comprised of a radiant energy reflector spun around its axis at a preselected frequency to provide amplitude modulation of the return echoes therefrom.

6. A radiant energy system as defined in claim 4 wherein the means for directing radiant energy includes a scanning antenna with said modulated target reflecting echoes proportional to the intensity of the illumination thereof.

7. A system for determining the direction and range of an object by directing radiant energy thereto and receiving return signals therefrom comprising a modulated standard target having a predetermined cross-section positioned on said object, means for directing radiant energy towards said object including said standard target, means for detecting return targets exclusively from said modulated standard target, and means for measuring the maximum intensity of said return echoes to provide said range of said object.

8. A system for determining the direction and range of an object as defined in claim 7 also including means to determine the point at which said maximum intensity occurs to provide said direction of said object.

9. A system for determining the direction and range of an object as defined in claim 7 wherein said modulated standard target is comprised of a spherical dielectric lens reflector with a rear reflecting cap and wherein said standard target modulation results from rotating said sphere around an axis parallel to the face of said cap thus being viewable with said cross-section from any direction.

References Cited

UNITED STATES PATENTS

| | | | |
|---|---|---|---|
| 749,436 | 12/1904 | De Forest | 343—12 |
| 1,115,530 | 11/1914 | Hammond | 343—112 |
| 2,212,110 | 8/1940 | Beurmann | 343—18 X |
| 2,403,603 | 7/1946 | Korn. | |
| 3,076,962 | 2/1963 | Norton. | |
| 3,145,382 | 8/1964 | Cuming et al. | 343—18 |
| 3,153,760 | 10/1964 | Henderson. | |

RODNEY D. BENNETT, *Primary Examiner.*

CHESTER L. JUSTUS, *Examiner.*

D. C. KAUFMAN, *Assistant Examiner.*